United States Patent [19]

Waugh

[11] 4,407,421

[45] Oct. 4, 1983

[54] GLASS CONTAINER HAVING MEANS FOR REDUCING BREAKAGE AND SHATTERING

[75] Inventor: Robert E. Waugh, Columbus, Ohio

[73] Assignees: The D. L. Auld Company, Columbus, Ohio

[21] Appl. No.: 331,420

[22] Filed: Dec. 16, 1981

[51] Int. Cl.³ ............................................. B65D 23/08
[52] U.S. Cl. ............................ 215/12 R; 215/DIG. 6
[58] Field of Search ..................... 215/1 R, 1 C, 12 R, 215/100 R, DIG. 6; 220/69; 206/524

[56] References Cited

U.S. PATENT DOCUMENTS

| | | | |
|---|---|---|---|
| 2,929,525 | 3/1960 | Glover et al. | 215/12 R |
| 3,924,767 | 12/1975 | Arrandale et al. | 215/12 R |
| 3,953,626 | 4/1976 | Suzuki et al. | 427/346 |
| 4,092,953 | 6/1978 | Waugh | 118/642 |
| 4,174,782 | 11/1979 | Obsomer | 215/1 C |
| 4,207,356 | 6/1980 | Waugh | 427/55 |
| 4,225,638 | 9/1980 | Waugh | 427/331 |

FOREIGN PATENT DOCUMENTS 2510457 10/1975 Fed. Rep. of Germany .... 215/12 R
2519808 11/1976 Fed. Rep. of Germany ... 215/100 R

*Primary Examiner*—William Price
*Assistant Examiner*—Sue A. Weaver
*Attorney, Agent, or Firm*—Biebel, French & Nauman

[57] ABSTRACT

A glass container of the type designed to be coated with a plastic material to reduce breakage and shattering. The glass container has a neck portion which terminates in a discharge opening, a mid-portion and a base having a bearing surface upon which said bottle stands. The base comprises a plurality of concentric annular ribs as longitudinal extensions defining first and second annular channels and a central reservoir which are concentric about the center of the base with the first channel being outside the second channel. The channels and the reservoir are dimensioned and located to be filled with a charge of cast plastic. When the base is coated in this manner shattering and fragmentation of the container at the base is reduced.

8 Claims, 7 Drawing Figures

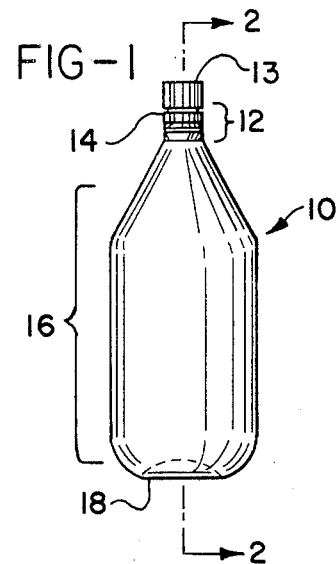
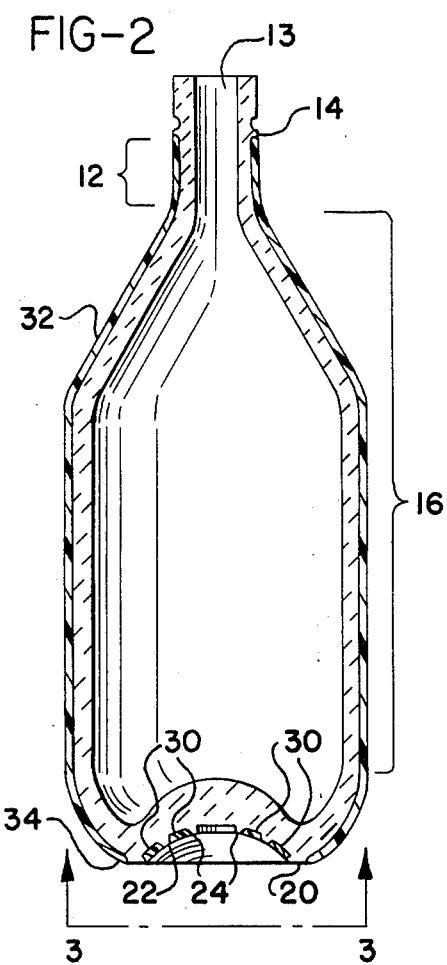
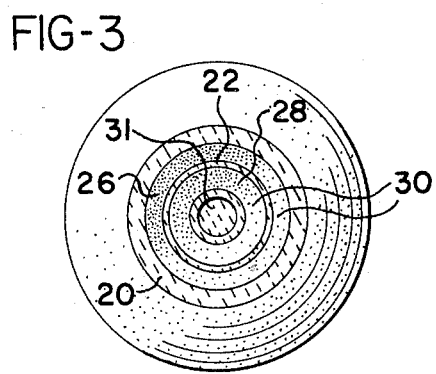
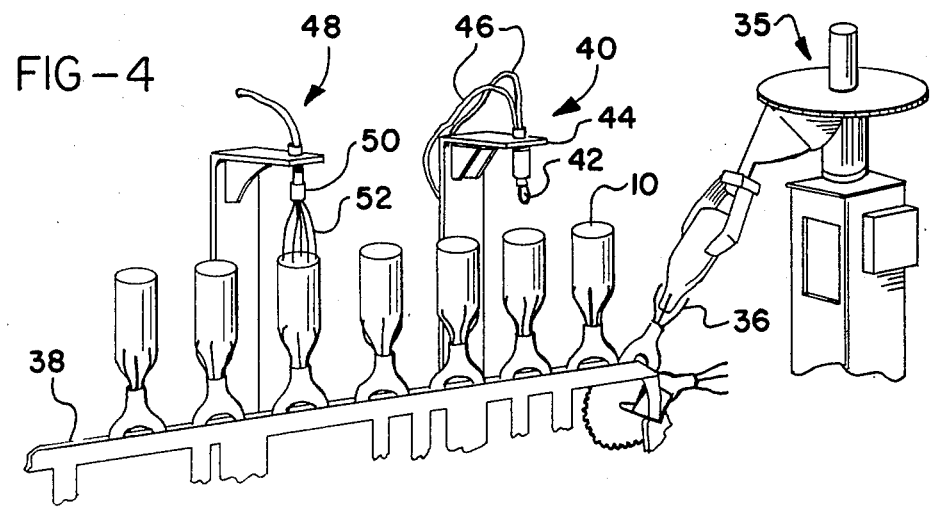

GLASS CONTAINER HAVING MEANS FOR REDUCING BREAKAGE AND SHATTERING

BACKGROUND OF THE INVENTION

The present invention relates to a glass container and, more specifically, to a glass bottle, the base of which is designed to be coated with plastic in selected areas to minimize shattering and fragment scattering.

Glass containers, such as glass bottles, have long been used as receptacles for soft drinks and various other commodities since they are superior in many respects to other types of containers. Glass containers can be formed in a wide variety of shapes and sizes. Additionally, glass containers are easily sanitized. The recent growth in interest in energy conservation and in resource conservation has increased the attractiveness of glass containers since these containers are easily cleaned and sterilized and are therefore easily reused. Glass containers are relatively sturdy and will hold up through a number of recyling operations although, after approximately 10 cycles, abrasion marks on the glass show and the grass looses its intrinsic strength.

One substantial drawback to the glass container is its tendency to shatter upon impact with a hard surface producing sharp glass shards. The safety risk involved with such breakage is heightened by the fact that many glass containers are pressurized (such as bottles containing carbonated beverages) and the shards which result from shattering the glass container will be scattered over a relatively large area. It has been determined that coating glass bottles with various plastic materials can significantly reduce shattering and reduce the scattering of glass shards. It has also been determined that a suitable coating properly applied to glass bottles will reduce the abrasion marks and reduce breakage during the filling and handling process, thereby increasing the number of times a glass container can be recycled. These techniques also permit a reduction in the amount of glass in the bottle and therefore lighter bottles. Various techniques and materials have been developed, therefore, for coating glass containers such as glass bottles. See, for example, U.S. Pat. Nos. 4,092,953, 4,207,356 and 4,225,638, all assigned to the assignee of the present invention.

The base of the glass bottle presents an unusual coating problem. Normally, bottles containing carbonated beverages and the like are filled and shipped standing on their base. As a result, a typical soft drink bottle contains thicker glass in its base than in its side wall such that the base can withstand the frequent collisions which occur as the bottles are conveyed along a production line and when the bottles are loaded into shipment containers, shipped and stacked on the grocers shelf. At the same time, because the base of a typical glass bottle is thicker, the base does not shatter to the same extent when the bottle breaks but large pieces of glass blow out from the base of the bottle.

In some cases, it is possible to leave the base uncoated and rely upon the side coating to hinge the base pieces to the bottle sides when blow out occurs. This is particularly true since an overall base coating is less desirable than no coating at all. One means that has been used to bottom coat a bottle is to dip the base of the bottle into a bath of resin. This is undesirable, however, because the bearing surface is coated with resin and the coating, particularly on the bearing surface is frequently marred, gouged, rubbed, and worn as the bottle rides on the base through cleaning, filling and shipping. This introduces lines of weakness in the coating on the bottle which leads to its easy rupture on being dropped. Furthermore, where the sides and base are coated with a continuous layer of plastic, the coating on the sides of the bottle may peel off if the coating is marred, worn or broken on the bearing surface. In particular, when the bottles are washed in caustic for reuse, the caustic will attack breaks in the coating at the bearing surface, leading to early coating failure.

Still, it would be better yet to have a coated base which does not provide for lines of weakness during use. However, this is difficult with present bottle designs. For instance, the bases of many glass containers are partially recessed, being drawn slightly inward such that the base is concave. Thus, if the base is simply coated uniformly, there is a tendency for the plastic to pool at the center, leaving the peripheries overcoated or only slightly coated such that there is not sufficient base reinforcement.

SUMMARY OF THE INVENTION

The present invention provides a glass container, the base of which is designed to be coated with plastic in selected areas to minimize fragment scatter upon blow out. While the invention is described with reference to a glass bottle and more particularly a bottle of the type in which soft drinks are normally distributed, it will be apparent that it has application wherever reinforcement of a glass container using cast plastic is desired. In accordance with the invention, the base of a glass container such as bottle is provided with a plurality of concentric circular channels and a reservoir at the center which are formed between circular ribs provided on the base of the bottle. One of the channel-forming ribs may be the annular plateau which provides the bearing surface on which the bottle stands and which will be uncoated. Since the plateau is uncoated, the plastic coating on the base and within the channels as will be described below, is not subject to being easily marred, gouged, rubbed and worn—the uncoated plateau bears the brunt of such wear. No weak points are therefore formed in the plastic coating in the base area. Otherwise, the channels are formed by ribs which are longitudinal extensions of the base glass. The channels and reservoir are designed to receive a predetermined charge of plastic material which is preferably dispensed onto the base as part of the container coating process from a bottom coater. In a preferred process for coating the base, the plastic is discharged from a nozzle means having a plurality of applicator tubes. Whether both the channels and the reservoir are charged with plastic depends on the bottle design. At least the channels and in some cases also the central reservoir are filled with plastic in a selected base coating process.

The channels direct the plastic to selected areas of the base. The depth and position of the channels in the base are such that for the particular container capacity being reinforced fragment scattering or so called "blow out" is prevented. For example, it has been found that for a standard 1.5 liter capacity bottle, the base is adequately reinforced with two plastic holding channels which are concentric about the center of the base. The innermost channel preferably has an inside diameter of about $1\frac{3}{8}''$ and an outside diameter of about $1\frac{7}{8}''$. The outer channel is contiguous with the inner channel and separated from it only by the outer rib of the inner channel. Preferably, the outer channel extends to the bearing surface plataeu which doubles as the outer wall of the outer channel.

Normally, the invention containers are side coated as well as bottom coated with plastic, but the disclosed base design can also be used to advantage for bottom reinforcement without side coating. Where the side exterior surfaces of a glass bottle are also coated, in another embodiment of the invention, the bottle neck is provided with an annular rib which has the function of causing the side coated plastic to terminate in a clean line that permits the plastic film to be thicker. Also, this prevents the coated plastic from interfering with obtaining a pressure tight cap seal and the cap from scratching or marring the coating as it is removed and replaced. Furthermore, it has been found desirable to position the bearing surface slightly inside the sides of the bottle as shown in FIG. 2 whereby the plastic cast on the sides of the bottle is slightly thicker near the base where additional reinforcement is advantageous. Preferably, the bearing surface diameter is the minimum diameter required to support the bottle. This reduces the glass susceptible to blow out in the base.

In accordance with the invention, the base exclusive of the bearing surface and preferably also the sides of the invention container are coated with a liquid polyurethane which is prepared by mixing a polyol and polyisocynate components and is cured in situ on the surface of the bottle by heating.

Thus, a principal object of the present invention is to provide a glass container adapted to base reinforcement with cast plastic in selected areas.

BRIEF DESCRIPTION OF THE DRAWINGS

FIG. 1 is a side elevation of a coated glass bottle in accordance with the present invention;

FIG. 2 is a section parallel the longitudinal axis of the bottle of FIG. 1;

FIG. 3 is a bottom view of the bottle of FIG. 1;

FIG. 4 is a schematic view illustrating one example of a production line for bottom coating the invention bottle;

FIG. 7 is an enlarged view of the base portion of a glass bottle in accordance with the present invention showing the different heights of ribs 22 and 24. Referring to FIG. 7, the bearing portion 20 surrounds a first channel 26 and a second inner concentric channel 28. Both channels are filled with a plastic material 30 and are concentric with an inner reservoir 31 which is optionally filled with a charge of cast plastic (not shown). A first circular rib 22 is positioned between channels 26 and 28 and a second smaller circular rib 24 is positioned between channel 28 and the central reservoir 31. As shown in FIG. 7, the height (H) of rib 22 as measured from the base of the rib is greater than the height (H') of rib 24 as measured from the base of that rib. In this manner, a line connecting the peaks of ribs 22 and 24 generally parallels the inwardly sloping contour of the base.

DETAILED DESCRIPTION OF THE INVENTION

Figure 5:
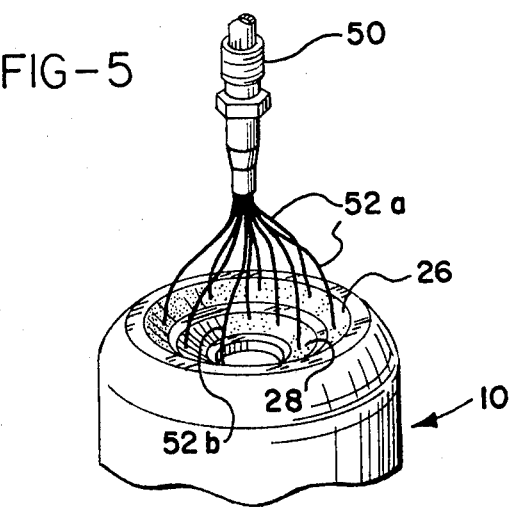
FIG. 5 is a schematic view of the nozzle means used in the bottom coating process shown in FIG. 4.

The invention bottle is shown in FIG. 1 where it is designated by the reference numeral 10. The bottle 10 comprises a neck portion 12 which terminates in a discharge opening 13. The upper extremities of the neck are contoured to accept a closing means such as a screw on or press fit bottle cap. The neck portion 12 of bottle is also formed with an optional terminal annular rib 14 which is a radial extension encircling the neck. When present, the rib 14 stops the flow of plastic coated on the sides of the bottle such that the cast plastic film does not feather into an unsightly irregular line at the top. The terminal rib also results in a thicker coating at the film termination point and reduces the possibility of delamination and enhances reinforcement. The cross section of the rib 14 is preferably a rounded rib having a height from the surface of the bottle of approximately 0.020 to 0.050 inch.

The mid portion 16 of the bottle flares outwardly from the neck portion 12 and may assume a variety of shapes and contours, for example, the bottle may be shaped according to a particular trade dress representing the origin of the bottle or its contents. The exterior surface of the mid portions of the bottle and the neck are coated with a layer of plastic 32 in the embodiment shown in FIGS. 1–3. This may be accomplished using the method and apparatus of commonly assigned U.S. Pat. Nos. 4,092,953, 4,207,356 and 4,225,638.

In the illustrated embodiment, the base 18 of the bottle 10 is drawn slightly inward along the longitudinal axis of the bottle as shown in FIG. 2. The thickness of the glass in the base 18 is typically greater than the thickness of the sides in the mid portion of the bottle.

The base 18 comprises an annular plateau or bearing surface 20 which extends outwardly from the base. The bottle is designed to stand on the bearing surface 20. Inside the bearing surface 20 are two annular ribs 22 and 24 which form the annular channels 26 and 28 and the reservoir 31 which characterize the present invention. Channels 26 and 28 are filled with cast plastic 30 in a manner described below. Where the base 18 has an inward slope as illustrated in FIG. 2, the height of the ribs is tapered such that the channels step-wise follow the inwardly sloping contour of the base. Thus, in FIG. 2, rib 22 is slightly higher than rib 24. For a 1.5 liter capacity bottle, rib 22 is approximately 1/16" as measured from the base of the rib to its peak, and the rib 24 is approximately 1/32". For bottles having a capacity larger than approximately 2.0 liters, a third concentric channel is desirable.

The width and depth of the channels as well as the number and the reservoir, depend on the size of the bottle and the amount of reinforcement which is desired. Since smaller bottles do not present the dangers which accompany the breakage of larger bottles, it will be apparent that the invention is particularly applicable to bottles having a capacity greater 0.5 liters and more so to 1.0 liter and greater capacity bottles. Using a 1.5 liter bottle as representative of the glass containers of the present invention, the bearing surface 20 is preferably approximately 3.0 inch in diameter and sits approximately 0.062 inch above the lower surface of the base. The outermost channel 26 which borders the bearing surface in FIG. 2 is preferably about 0.312 inch wide and has a diameter, as measured from the inner edge of the bearing surface of approximately 2.5 inch. The rib 22 between the channels 26 and 28 preferably has a triangular or truncated triangular cross section and terminates in a 0.062" rounded peak. The inner channel 28 is preferably about 0.287 inch wide and has a 1⅜ inch diameter as measured from the outer edge of rib 24. The actual rib design and the selection of areas to be filled with plastic must be determined for each bottle design.

It will also be noted that the bottle design of the present invention provides for a slightly thicker film at the bottom termination line 34 of the side coating 32 which provides additional reinforcement to the protruding side portions at the bottom of the bottle which are vulnerable to collision and breakage. This enhanced thickness is achieved by positioning the bearing surface 20 slightly inside the side wall of the bottle as shown.

The sides and bottom of the invention bottle may be coated with various plastics. A preferred coating, however, is a liquid polyurethane plastic of the type disclosed in U.S. Pat. No. 4,092,953, which is a mixture of "A" and "B" components. Basically that mixture is one of a polyether polyol component ("A") which may be difunctional, trifunctional and/or tetrafunctional polypropylene glycol containing a suitable catalyst and a diisocynate component ("B") such as an aliphatic diisocynate. An example of the diisocynate is Desmodur from Mobay or IPDI from Chemische Werke Huls, Ag., and the polyether polyol may be one or more of the Pluracol materials (P-410 or TP-440) from BASF Wyandotte. It may also be a polyether-polyester polyol combination. The ratio of components A:B is preferably 50-60:40-50. A polyester polyol or polylactone polyol should be used in place of the polyether polyol. The mixture of "A" and "B" components of this type cures through catalytic action, under heat, such as produced by infrared radiation. Although the aforementioned two component polyurethane is prefered, single component, photocurable, polyurethanes of known types can also be used.

It is desirable to prime the glass bottle with a silane before coating. As an example, a mixture of approximately 2% castor oil and up to approximately 2% silane (Dow 6020, 6040 or 6075 from Dow Corning Corp.) which are respectively, 3-(2-aminoethylamine) propyltrimethoxysilane, glycidoxypropyltrimethoxysilane and vinyltriacetooxysilane) in a solvent (70% isopropyl alcohol and 30% acetone) may be used. Other known silane primers may also be used. The primers may be pre-applied by spraying or dipping followed by drying to remove the solvent. Alternatively it may be applied as an initial step in a continuous bottle coating process.

Bottom coating may be accomplished using a coating apparatus such as illustrated in FIG. 4. In the most typical case, the invention bottles will be bottom coated before or after having been side coated using processes such as disclosed in U.S. Pat. Nos. 4,092,953 and 4,225,638. FIG. 4 illustrates a process wherein bottles 10 are removed from a side coating line by an unloading means 35 and, in the process, inverted and placed on the bottom coating line wherein the bottles are primed and then coated. On the bottom coating line, the bottles are held bottom up by means of neck holding chucks 36 which are advantageously mounted and interconnected by a conveying means such as a chain conveyor 38. Once on the line, the bottles 10 are conveyed to a primer station 40 where the bottles are sprayed with primer dispensed from a nozzle 42 mounted on an overhanging platform 44 supplied with one of the above described primer compositions through supply lines 46 which are pressurized. The bottle may heated to remove any of the solvent in the primer composition prior to coating the base with plastic, otherwise, if the bottle is pre-heated, the solvent may be flashed off.

After priming, the bottles are moved to a base coating station 48 where in the embodiment illustrated the channels 26 and 28 on the base of the bottle and in some cases the reservoir 31 are selectively coated with a liquid uncured plastic dispensed through nozzle means 50 which is provided with a plurality of applicator tubes 52. Prior to plastic coating the bottles may be heated to 110°-130° F. to aid the flow of the coating onto the bottle. As shown more fully in FIG. 5, which illustrates a nozzle means for bottom coating a 1.5 liter soft drink bottle, the nozzle means 50 comprises a first set of applicator tubes 52a and a second set 52b. Sets 52a and 52b are each mounted in concentric circular patterns corresponding to the channels 26 and 28 to be coated. Each applicator tube delivers a quantity of plastic to the appropriate channel in the base of the bottle which is predetermined to meld with the quanta delivered from the other applicator tubes serving that channel and fill the channel without overfilling it. Because the outside channel 26 is larger and has a greater capacity for cast plastic then the inside channel 28, there are more tubes in the first set of applicator tubes 52a than the second set 52b. In this manner, more plastic is dispensed to the outer channel when a single pumping station casting machine is used. The machine and nozzles are designed to give a constant flow rate in grams per minute per tube, therefore the outer channel will receive more plastic than the inner channel. As an alternative to using more applicator tubes in set 52a than set 52b, applicator tubes 52a and 52b may be supplied by two individually adjustable pumping stations that will allow the flow rate for pumping station to be adjusted so set 52a delivers more plastic to the base of the bottle within the preset base coating time than set 52b delivers to the inner channel. The number of applicator tubes and the spacing between the tubes in an individual nozzle depends on the capacity of the bottle, and more directly, the size of the base. It has been found, however, that between 10 and 15 tubes spaced apart approximately ½ to ¾ inch may be used in the set serving the outer channel and 6 to 8 tubes spaced ½ to ¾ inch may be used in the set of applicator tubes servicing the inner channel in a 1.5 liter bottle. The tubes preferably have an inner diameter of approximately 0.033" and an outer diameter of approximately 0.050". Each set of tubes may be maintained in the circular orientation using a spacer bar, or as illustrated in FIG. 5, the tubes may be of a sturdy but flexible material which maintains its location relative to the base of the bottle under the pressure from the casting head. Preferably, the applicator tubes 52 of the nozzle means 50 are designed for each type or bottle so the desired arrangement is fixed for the size of the base and the channel positions for the particular bottle design.

Figure 6:
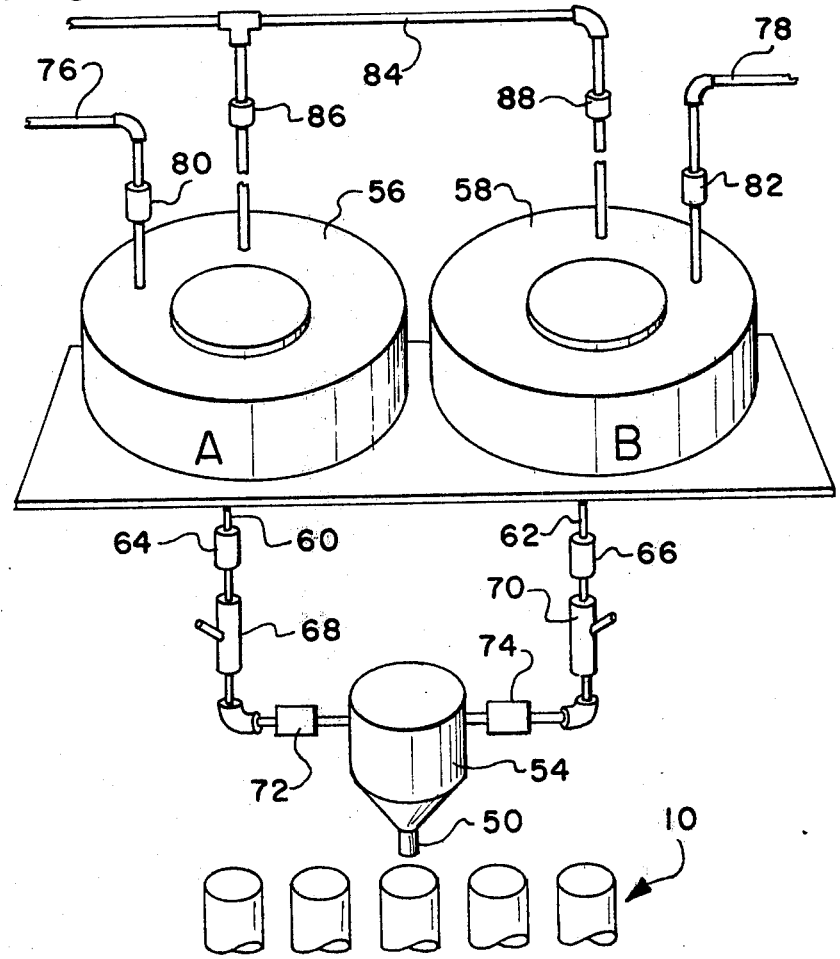
FIG. 6 is a schematic view of a mixing apparatus for use with the invention.
Figure 7:
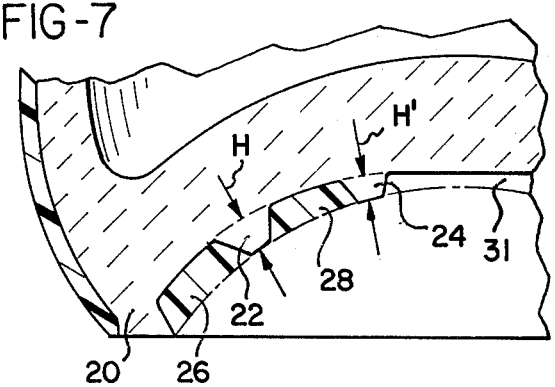
FIG. 7 is a partial cross-sectional view of the base portion of a glass bottle constructed in accordance with the present invention.

In a preferred embodiment the cast plastic is a mixture of components "A" and "B" as described above. These components may be supplied to the nozzle means 50 using a mixing apparatus as shown in FIG. 6. Casting head 54 has a nozzle means 50 which has a plurality of applicator tubes 52 (not shown in FIG. 6).

The "A" and "B" materials are supplied from tanks 56 and 58 which may be stirred for the purpose of degassing. The degassed material then flows down pipes 60 and 62 through ball valves 64 and 66 through filters 68 and 70 and metering devices 72 and 74 to the casting and mixing head 54, wherein the components are mixed. Located beneath the casting head 54 is the conveyor which carries the bottles 10 with which the casting head 54 is timed such that when a bottle 10 is under the casting head, a predetermined amount of plastic is cast and then the conveyor moves the next bottle into position.

Tanks 56 and 58 are supplied with the "A" and "B" components, respectively, through supply lines 76 and 78 equipped with ball valves 80 and 82. The tanks 56 and 58 may be pressurized using air or nitrogen which is supplied under pressure to the tanks through line 84 via ball valves 86 and 88 which prevent tanks 56 and 58 from losing pressure when line 84 is disconnected.

Having described the invention in detail and by reference to specific embodiments thereof, it will be apparent that numerous variations and modifications are possible without departing from the invention as defined by the following claims.

What is claimed is:

1. In a glass container of the type which is designed to be coated with a plastic material to reduce breakage and shattering comprising a neck portion which terminates in a discharge opening, a mid-portion, and a base, said base presenting a bearing surface upon which said bottle stands, the improvement wherein:

said base comprises a plurality of concentric annular ribs as longitudinal extensions defining first and second annular channels, said channels being concentric about the center of said base with said first channel being outside said second channel and said second channel surrounding a reservoir, said channels being filled with a charge of cast plastic, and said channels and reservoir being designed such that they aid in preventing said container from shattering when filled with a charge of cast plastic.

2. The glass container of claim 1 wherein said first channel is defined by said bearing surface and a first rib, said second channel is defined by said first rib and a second rib concentric and inside the first and said reservoir is defined by said second rib.

3. The glass container of claim 2 wherein said base is drawn inward along the longitudinal axis of said bottle and the height of said first rib, as measured from the base of said rib, is greater than the height of said second rib.

4. The glass container of claim 3 wherein said container has a capacity greater than 0.5 liters.

5. The glass container of claim 3 wherein the height of said ribs is such that a line of sight from the top of said first rib to the top of said second rib generally parallels the inward draw of said base.

6. The glass container of claim 1 wherein the side and neck portions of said bottle are coated with a plastic material.

7. The glass container of claim 6 wherein said neck portion of said bottle comprises an annular rib.

8. The glass container of claim 1 wherein said reservoir is filled with a plastic material.

* * * * *